Nov. 6, 1962 — K. DEBUS — 3,062,327
PROCESS OF PRODUCING AN ADDITIONAL DYNAMIC PRESSURE
ON THE ROAD FOR RAPID-BRAKING OF ROAD VEHICLES
Filed March 18, 1958 — 4 Sheets-Sheet 1

INVENTOR.
Klaus DEBUS
BY

Nov. 6, 1962  K. DEBUS  3,062,327
PROCESS OF PRODUCING AN ADDITIONAL DYNAMIC PRESSURE
ON THE ROAD FOR RAPID-BRAKING OF ROAD VEHICLES
Filed March 18, 1958  4 Sheets-Sheet 2
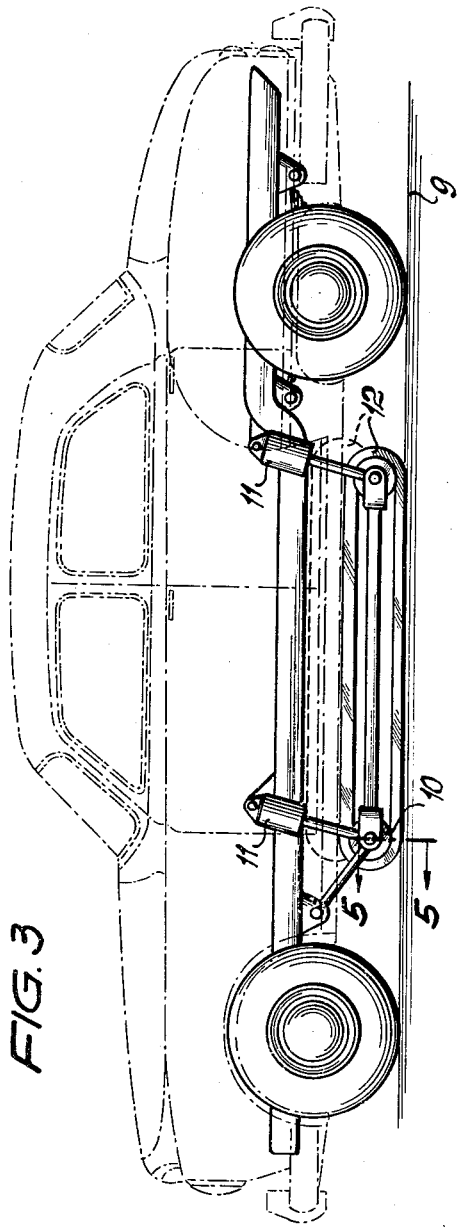
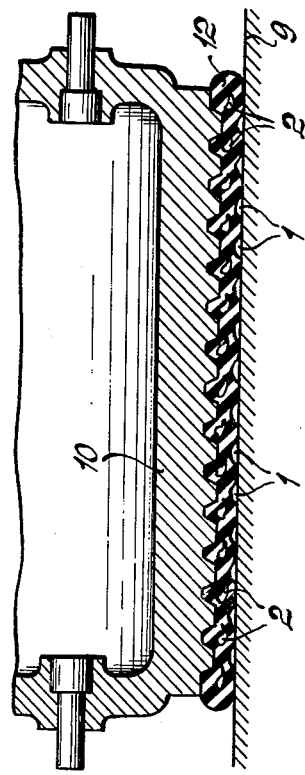
INVENTOR.
Klaus DEBUS
BY Nov. 6, 1962 K. DEBUS 3,062,327
PROCESS OF PRODUCING AN ADDITIONAL DYNAMIC PRESSURE
ON THE ROAD FOR RAPID-BRAKING OF ROAD VEHICLES
Filed March 18, 1958 4 Sheets-Sheet 4

FIG. 6

INVENTOR.
Klaus DEBUS
BY

United States Patent Office
3,062,327
Patented Nov. 6, 1962

3,062,327
PROCESS OF PRODUCING AN ADDITIONAL DYNAMIC PRESSURE ON THE ROAD FOR RAPID-BRAKING OF ROAD VEHICLES
Klaus Debus, Iffiandstrasse 4, Hannover-Waldhausen, Germany
Filed Mar. 18, 1958, Ser. No. 722,161
Claims priority, application Germany Mar. 22, 1957
9 Claims. (Cl. 188—5)

This invention relates to vehicles brakes and, in particular, to brake arrangements for braking high speed vehicles.

Brake arrangements are known for braking high speed planes to halt relatively quickly, but there is not known any effective braking for land vehicles which operates as effectively for reducing speed, such as the braking arrangements that are employed for aircraft. This comes about because vehicle brakes generally are of the mechanical type which depend upon friction of brake lining on a brake drum, whereas, with aircraft, aero-dynamic principles are employed.

Vehicle brakes heretofore have usually been of the mechanical nature referred to above, although there have also been proposed brake arrangements which operate by engaging the roadway with a single large hemispherical member which is drawn along the roadway by the vehicle and in which member a low pressure is produced by a vacuum pump.

Other mechanical devices have been employed which directly engage the road-way and brake by friction but these have a tendency to damage the roadway and have proved to be difficult to control and to make smooth in actuation.

It has also been proposed to employ wings or air foils attached to the vehicle for braking, but these have the inherent fault of necessarily extending outwardly of the vehicle so that too much width is required for use in an ordinary traffic lane. Such aerodynamic devices are also ineffective except when the vehicle is operating at high speed. The same disadvantages with respect to the ineffectiveness at low speed are encountered with nozzle arrangements underneath the vehicle.

With the foregoing in mind, it is an object of the present invention to produce a braking device for a ground vehicle which eliminates the disadvantages referred to above and which produces high braking power and without damaging the roadway.

In general, the objectives of the present invention are realized by utilizing the movement of a vehicle to create energy and then absorbing the energy to produce a braking effect on the vehicle.

In one form of the invention, a wide endless belt or band is carried on rollers beneath the vehicle and is movably supported so it can be moved downwardly against the road-way. The rotation of the rollers is retarded and this produces the desired braking effect on the vehicle.

The belt or band may be provided with a surface that enhances the frictional engagement of the band with the roadway and the band may, furthermore, have suction chambers on its road-way side which serve to increase the force with which the band engages the roadway over the entire length and width of the roadway engaging portion thereof.

In another form of the invention, power is taken from a wheel and a propeller is driven thereby that directs the blown air forwardly. The propeller is retractible into the confines of the vehicle body.

The nature of the present invention will be more clearly apparent upon reference to the following specification taken in connection with the accompanying drawings in which:

FIGURE 3 is a simplified more or less diagrammatic view of a vehicle having a braking device according to the present invention mounted thereon;

FIGURE 5 is a vertical view indicated by line A—B on FIGURE 3 showing the brake band engaging the roadway; and FIGURE 6 is a diagrammatic representation of the system for controlling and operating the braking device.

FIGURES 1 through 6 show the principal form of the present invention wherein an endless brake band is carried beneath a vehicle for being selectively moved into engagement with a roadway for braking the vehicle carrying the brake band. The brake band preferably has suction means for engaging the roadway and has means for effecting driving engagement with the supporting rolls therefor for the efficient transfer of power through the brake band into the rolls.

Figure 1:
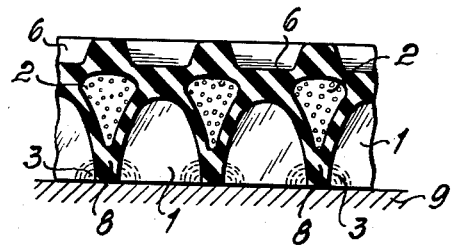
FIGURE 1 is a sectional view showing a portion of the brake band of the present invention which is carried by the vehicle and which engages the roadway when the brakes of the vehicle are applied.

FIGURE 1 shows a fragmentary section through the brake band, which is made of an elastic material, such as rubber, or a rubber-like material, and so shaped that there are open hollow spaces on the road engaging side thereof. Within the body of the brake band are closed hollow spaces 2 which are filled with air, preferably, compressed air. The ribs between the hollow spaces may advantageously be provided with thin gasket-like members 3 of elastic material to provide for a better sealing engagement of the brake band with a roadway.

Figure 2:
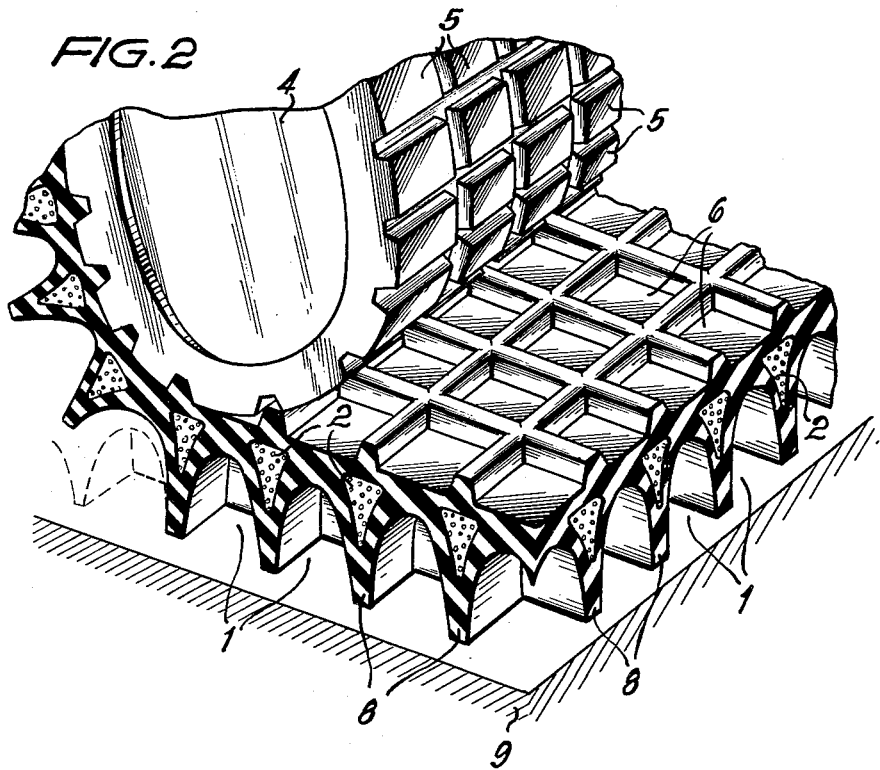
FIGURE 2 is a perspective view showing the brake band of FIGURE 1 and a portion of one of the supporting rollers therefor and with the brake band in engagement with the roadway.

FIGURE 2 shows a perspective cross section of the brake band, indicated by reference numeral 6, and a supporting roll 4. Roll 4 has a profile 5 thereon which is complementary to the profile formed on the roll side of the brake band. FIGURE 2 also shows how one of the open hollow spaces, as at 7, having the confining ribs 8 engages the surface of the roadway 9.

FIGURE 2 also illustrates that the hollow spaces 2 of the brake band, which are filled with compressed air, extend both transversely and longitudinally of the brake band.

Figure 4:
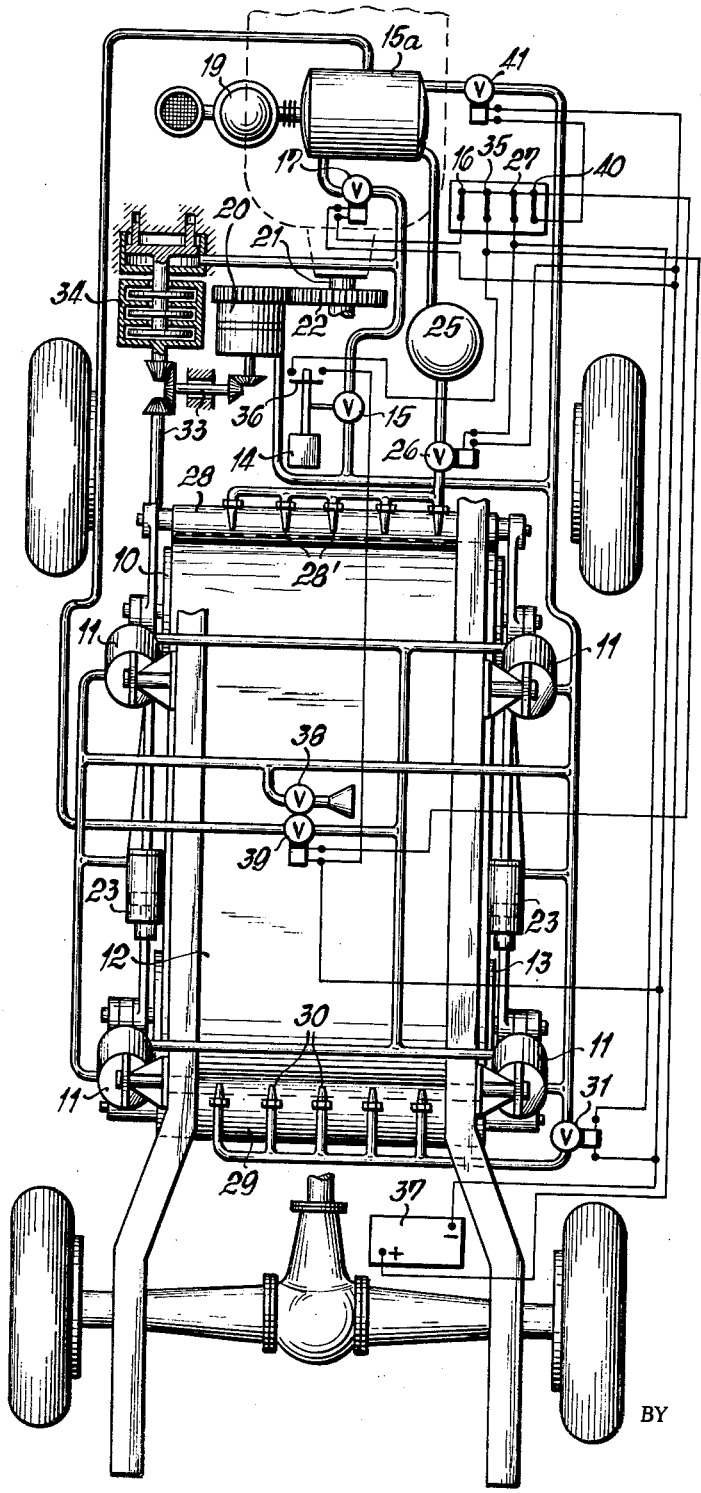
FIGURE 4 is a plan view looking down on top of the chassis of FIGURE 3 with the operative parts of the braking system illustrated more in detail.

FIGURES 3 and 4 illustrate, somewhat diagrammatically, how the brake band is carried beneath a vehicle between the front and back wheels thereof. In FIGURE 3, the brake band is shown in its lower working position while the dashed lines indicate the position which it occupies when elevated to its idle position.

Since the brake band is supported on rolls 10 at its opposite ends, when the brake band engages a roadway, it runs thereon similar to a Caterpillar tread, and by restraining the rotation of the rolls, a braking effect on the vehicle carrying the brake band can be had.

The brake band in FIGURES 3 and 4, which is indicated by reference numeral 12 therein, is pressed against the roadway by moving the rolls downwardly by energizing supporting pressure cylinders 11 that are connected between the vehicle frame and the said rolls. At least the front roll 10 has links pivoted thereto and extending forwardly and upwardly to the vehicle frame and pivoted thereto thereby to support the braking loads imposed on the braking arrangement.

In FIGURE 5, which is an enlarged section transversely through the front pressure roll and the brake band, it will be seen, that when the brake band is pressed against the roadway, the open hollow spaces are pressed out nearly flat so that the air is pushed out therefrom while simultaneously the hollow spaces 2 are also compressed.

As soon as the brake band moves backwardly from the front pressure roll 10, the hollow spaces will tend to expand thrust reducing the pressure therein and this causes atmospheric pressure to act on top of the lower reach of the brake band to press it into effective engagement with the roadway. The pressure in the hollow spaces will rise relatively slowly due to the porosity of the roadway, particularly, where the roadway is paved and where the thin gasket members 3 are employed.

According to the degree of the suction in the hollow spaces, and which represents, to a degree, the total force P that is exerted downwardly on the brake band, there will be more or less braking power which may be calculated by the equation $P'=fP$, where $f$ is the coefficient friction between the brake band and the roadway. This braking power, which is realized by restraining the rotation of the rolls 10, represents additional braking power over what is provided by the conventional brakes of the vehicle and also represents additional braking power over what could be obtained by a simple friction band not having the additional force of air pressure exerted thereon.

At the rear one of the rolls 10, and which may be termed as a "loosener roll," the brake band is released from the roadway and then moves forwardly along the top reach so that, with the brake band running like a Caterpillar tread, there is a smooth and continues braking action with new suction chambers being continuously drawn against the roadway under the front pressure roll.

A circuit for actuating a brake arrangement according to the present invention is somewhat diagrammatically illustrated in FIGURE 6. This circuit is arranged, taking into account the fact that, even at the best, about one-tenth of a second or more is required for changing the foot from a vehicle accelerator to a vehicle brake pedal. To eliminate this lost time, the present invention proposes the use of a combined acceleration-brake pedal which is indicated in FIGURE 6 at 14.

Connected with the pedal to be operated thereby is a normally closed valve 15 which is opened when the brake pedal is actuated to initiate a supply of air from air tank 15a through conduit 15b to the upper ends of the pressing cylinders 18 that are connected with the pressure rolls 10 for the brake band 12.

Serially arranged with valve 15, and under the control of a switch arranged 16, is a normally open electromagnetic valve 17. When this valve is closed by adjustment of switch 16, valve 15 is ineffective and normal braking of the vehicle by the brake pedal is obtained.

The tank 15a is supplied with air under pressure from a compressor 19.

Inasmuch as the brake band is supposed to engage the roadway without slipping, there is provided means for driving the brake band so that it is in motion at about the speed of the vehicle at the time it engages the roadway. This is accomplished by connecting the vehicle drive shaft 21 by way of transmission 22 and clutch 20 with at least the front roll 10. The clutch is air operated and is connected in circuit to receive pressure fluid when valve 15 is opened so that the driving of the brake band will commence as soon as the brake pedal is operated whereby the brake band, when it engages the roadway, has the lower reach thereof substantially stationary relative to the roadway.

For maintaining the brake band taut, there may be a connection between the front and back rolls which is extensible by means of a fluid motor 23 contained therein that is also connected to receive pressure fluid when valve 15 is opened.

Inasmuch as the upper reach of the brake band may be subject to considerable vibration, I prefer to arrange plates 24 on opposite sides thereof which limit the up and down vibratory movement of the upper reach.

Under many conditions, the open hollow spaces that are supposed to engage the roadway and be confined thereby, will not seal particularly well with the roadway on account of dust or dirt on the roadway. To offset this tendency, there is provided a container 25 containing an emulsifying agent dissolved in water which tank is connected with pressure tank 15a so as to be under pressure. A conduit leads from tank 25 through a valve 26 to a nozzle and roll arrangement which roll engages the roadway side of the brake band. When valve 26 is opened, which is brought about by operation of a switch 27, the water and emulsifying agent is supplied to the brake band and this greatly enhances the sealing power thereof against the roadway.

At the rear end of the brake band, there is provided a cleaning roll 29 while there are compressed air nozzles for blowing air against the cleaning roll and brake band to clean dirt therefrom. A control valve, under the control of switch 27, is disposed in the conduit leading to nozzles 30 to control the supply of air thereto.

Disposed between the front and back rolls 10 are a plurality of spring pressed additional pressure rolls 32 which press the band against the roadway and which are driven by the band. The rolls 32 and at least the front roll 10, are connected with a brake arrangement 34 by a drive linkage 33. This drive linkage may consist of flexible shafts, for example, and the main brake may consist of friction brake means, fluid brake means, or electric brake means, such as induction brakes. The main brake is for the purpose of absorbing the energy transmitted into the rolls by the brake band thereby to exert a braking force on the brake band, which, in turn, is exerted between the brake band and the roadway to brake the carrying vehicle.

The main brake may also consist of a fly wheel arrangement which is accelerated during braking to store energy and which energy can then be returned to the brake band by the same drive linkage and being employed for accelerating the vehicle.

As an example, a car of one ton moving at a speed of 55 miles per hour, can, during an interval of 1.4 seconds produce 370 H.P. which can again be employed for accelerating the vehicle.

Following a braking operation, opening of electro-magnetic valves 38 and 39 will cause retraction of the brake band upwardly from the road. For preventing accidental energization of these electromagnetic valves, which are in circuit with switch 35, there is an interrupter switch 36 also in the circuit which is opened by actuation of the brake pedal.

Means are also provided, in the form of switch 40, connected to an electromagnetic valve 41, which bypasses valves 15 and 17, for actuating the brake band independently of the brake pedal.

The present invention operates to insure that there will be a strong downward pressure exerted on the brake band that will greatly increase its operating efficiency. This comes about not only because of the rollers pressing on the top of the lower reach of the brake band, but also on account of the suction effect created by the suction cavities opening outwardly from the brake band. The suction cavities produce an under pressure between the brake band and the roadway that greatly increases the force with which the brake band engages the roadway and thus multiplies the braking force that can be obtained through the brake band.

It will also be appreciated that the braking device or system of the present invention is not only useful for land bound vehicles but could also be user for aircraft when they are on the ground. It will be understood therefore that in the claims the term "ground engaging" is meant to mean not only conventional ground vehicles but also aircraft and the like which operate on the ground at least part of the time.

It will be understood that this invention is susceptible to modification in order to adapt it to different usages and conditions; and, accordingly, it is desired to comprehend such modifications within this invention as may fall within the scope of the appended claims.

I claim:

1. A braking arrangement for a ground contacting vehicle which comprises: a pair of rollers supported on the lower portion of the vehicle in longitudinally spaced relation with their axes of rotation extending at right angles to the longitudinal axis of the vehicle and with the axes so positioned that the peripheries of the rollers are tangential to the same horizontal plane at the bottom of the rollers, means supporting the rollers on the vehicle for selective movement in a vertical plane, a brake band extending about said rollers so that downward movement of the rollers will bring the band into engagement with the roadway on which the vehicle is traveling, the surface of the band having suction creating cavities opening outwardly of the band, said brake band being formed of resilient rubber-like material and being adapted for engaging the roadway in a substantially slip-free manner whereby as the vehicle moves when the brake band is engaged with the roadway the said rollers will be driven by the brake band, brake means mounted on the vehicle, and means operatively connecting said brake means to said brake band whereby to brake said brake band and thereby exert a braking force on the vehicle through said rollers.

2. A braking arrangement for a ground contacting vehicle which comprises: a pair of rollers supported on the lower portion of the vehicle in longitudinally spaced relation with their axes of rotation extending at right angles to the longitudinal axis of the vehicle and with the axes so positioned that the peripheries of the rollers are tangential to the same horizontal plane at the bottom of the rollers, means supporting the rollers on the vehicle for selective movement in a vertical plane, a brake band extending about said rollers so that downward movement of the rollers will bring the band into engagement with the roadway on which the vehicle is traveling, the surface of the band having suction creating cavities opening outwardly of the band, said brake band being formed of resilient rubber-like material and being adapted for engaging the roadway in a substantially slip-free manner whereby as the vehicle moves when the brake band is engaged with the roadway the said rollers will be driven by the brake band, brake means mounted on the vehicle, and means operatively connecting said brake means to said brake band whereby to brake said brake band and thereby exert a braking force on the vehicle through said rollers, a drive connection extending from the drive shaft of the vehicle to at least one of said rollers and including a clutch, and means for actuating said clutch to effect driving of said one roller and thereby said brake band prior to engagement of the brake band with the roadway so that the brake band will engage the roadway with a minimum of slippage.

3. A braking arrangement for a ground contacting vehicle which comprises; a pair of rollers supported on the lower portion of the vehicle in longitudinally spaced relation with their axes of rotation extending at right angles to the longitudinal axis of the vehicle and with the axes so positioned that the peripheries of the rollers are tangential to the same horizontal plane at the bottom of the rollers, means supporting the rollers on the vehicle for selective movement in a vertical plane, a brake band extending about said rollers so that downward movement of the rollers will bring the band into engagement with the roadway on which the vehicle is traveling, the surface of the band having suction creating cavities opening outwardly of the band, said brake band being formed of resilient rubber-like material and being adapted for engaging the roadway in a substantially slip-free manner whereby as the vehicle moves when the brake band is engaged with the roadway the said rollers will be driven by the brake band, and means operatively connecting at least one of said rollers to said brake means whereby to brake said roller when it is driven by the brake band and therethrough to brake said brake band, which, in turn, exerts a braking force on the vehicle, through said rollers, a drive connection extending from the drive shaft of the vehicle to at least one of said rollers and including a clutch, and means for actuating said clutch simultaneously with the initiation of the movement of said rollers and brake band toward the roadway whereby to set the brake band into motion before it engages the roadway to reduce to a minimum the speed of the brake band relative to the roadway.

4. A rapid braking device according to claim 3 in which at least the said one of said rollers that is connected to the brake means and the brake band have interfitting portions forming a positive drive connection between the band and the said roller, and there is an expansible motor means connected between the rollers energizable for urging the rollers away from each other to maintain said brake band taut.

5. A rapid braking device according to claim 3 in which there is an expansible motor means connected between the rollers energizable for urging the rollers away from each other to maintain said brake band taut, there being a plurality of other rollers drivingly connected with at least the said one of said rollers that is connected to said brake means and engaging the upper side of the lower roadway engaging reach of said brake band and resiliently urged toward the brake band thereby to press the brake band against the roadway and to be in power transmitting relation to the brake band.

6. A braking arrangement for a ground contacting vehicle which comprises: a pair of rollers supported on the lower portion of the vehicle in longitudinally spaced relation with their axes of rotation extending at right angles to the longitudinal axis of the vehicle, said vehicle having brakes and a brake pedal, fluid motors supporting the rollers on the vehicle and reversibly energizable for moving the rollers toward and away from the roadway on which the vehicle is traveling, a brake band extending around said rollers so that downward movement of the rollers will bring the band into engagement with the roadway, said brake band and at least one of said rollers being in power transmitting relation so that as the brake band is driven by the roadway, the roller will be driven by the brake band, power absorbing means connected with the said one of said rollers for absorbing the power transmitted thereto by the brake band, a source of fluid under pressure, and valve means connected with said fluid motors operable to supply fluid to said motors from said source and operated by said brake pedal when moving in its braking direction for energizing said fluid motors to move the brake band into engagement with the roadway.

7. A braking arrangement according to claim 1 in which means is provided for supplying liquid to the roadway side of the brake band immediately prior to engagement of the brake band with the roadway thereby to enhance the sealing of the brake band with the roadway.

8. A braking arrangement for a ground contacting vehicle which comprises: a pair of rollers supported on the lower portion of the vehicle in longitudinally spaced relation with their axes of rotation extending at right angles to the longitudinal axis of the vehicle and with the axes so positioned that the peripheries of the rollers are tangential to the same horizontal plane at the bottom of the rollers, means supporting the rollers on the vehicle for selective movement in a vertical plane, a brake band extending about said rollers so that downward movement of the rollers will bring the band into engagement with the roadway on which the vehicle is traveling, the surface of the band having suction creating cavities opening outwardly of the band, said brake band being formed of resilient rubber-like material and being adapted for engaging the roadway in a substantially slip-free manner whereby as the vehicle moves when the brake band is engaged with the roadway the said rollers will be driven by the brake band, brake means mounted on the vehicle, and means operatively connecting said brake means to said brake band whereby to brake said brake band and thereby exert a braking force on the vehicle through said rollers, said brake band being formed with closed cavity means therein and compressed gas in said closed cavity means.

9. A braking arrangement for a ground contacting vehicle which comprises: a pair of rollers supported on the lower portion of the vehicle in longitudinally spaced relation with their axes of rotation extending at right angles to the longitudinal axis of the vehicle and with the axes so positioned that the peripheries of the rollers are tangential to the same horizontal plane at the bottom of the rollers, means supporting the rollers on the vehicle for selective movement in a vertical plane, a brake band extending about said rollers so that downward movement of the rollers will bring the band into engagement with the roadway on which the vehicle is traveling, the surface of the band having suction creating cavities opening outwardly of the band, said brake band being formed of resilient rubber-like material and being adapted for engaging the roadway in a substantially slip-free manner whereby as the vehicle moves when the brake band is engaged with the roadway the said rollers will be driven by the brake band, brake means mounted on the vehicle, and means operatively connecting said brake means to said brake band whereby to brake said brake band and thereby exert a braking force on the vehicle through said rollers, the said suction creating cavities in said brake band being formed by longitudinal and transverse ribs on the outwardly facing side of said brake band, and there being thin flexible gasket means carried by said ribs and extending around the open sides of said cavities for enhancing the sealing engagement of the brake band with a roadway.

References Cited in the file of this patent
UNITED STATES PATENTS

| | | |
|---|---|---|
| 849,302 | Whelchel | Apr. 2, 1907 |
| 1,258,318 | Corkran | Mar. 5, 1918 |
| 1,287,483 | Slye | Dec. 10, 1918 |
| 1,732,544 | Sparhawk | Oct. 27, 1929 |
| 1,754,397 | Neustatter | Apr. 15, 1930 |
| 2,149,161 | Byrnes | Feb. 28, 1939 |
| 2,177,511 | Aikman | Oct. 24, 1939 |
| 2,203,777 | Ditmers | June 10, 1940 |
| 2,519,774 | Letner | Aug. 22, 1950 |
| 2,541,227 | Findley | Feb. 13, 1951 |
| 2,645,313 | Schaadt | July 14, 1953 |
| 2,650,679 | Durkin | Sept. 1, 1953 |
| 2,932,370 | Kraus et al. | Apr. 12, 1960 |
| 2,974,741 | Witzmann | Mar. 14, 1961 |